US011403934B2

(12) United States Patent
Soo et al.

(10) Patent No.: US 11,403,934 B2
(45) Date of Patent: Aug. 2, 2022

(54) METHOD AND APPARATUS FOR WARNING A USER ABOUT A SUSPICIOUS VEHICLE

(71) Applicant: MOTOROLA SOLUTIONS, INC., Chicago, IL (US)

(72) Inventors: Swee Yee Soo, Gelugor (MY); Chu Hau Tan, Bagan Serai (MY); Choon Kang Wong, Ipoh (MY); Chee Yin Wong, Georgetown (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 485 days.

(21) Appl. No.: 16/517,714

(22) Filed: Jul. 22, 2019

(65) Prior Publication Data

US 2021/0027605 A1 Jan. 28, 2021

(51) Int. Cl.
| G08B 21/18 | (2006.01) |
| G06F 9/451 | (2018.01) |
| G06Q 50/26 | (2012.01) |
| H04W 4/029 | (2018.01) |
| G01S 19/10 | (2010.01) |
| G08B 7/06 | (2006.01) |
| G06V 20/00 | (2022.01) |
| G06V 20/62 | (2022.01) |

(52) U.S. Cl.
CPC ............ *G08B 21/182* (2013.01); *G01S 19/10* (2013.01); *G06F 9/451* (2018.02); *G06Q 50/265* (2013.01); *G06V 20/00* (2022.01); *G08B 7/06* (2013.01); *H04W 4/029* (2018.02); *G06V 20/625* (2022.01)

(58) Field of Classification Search
None
See application file for complete search history.

(56) References Cited

U.S. PATENT DOCUMENTS

| 8,892,132 | B2 * | 11/2014 | Monks ...................... G01S 5/02 |
| | | | 455/456.5 |
| 9,084,103 | B2 | 7/2015 | Monks et al. |
| 9,305,323 | B2 | 4/2016 | Alazraki et al. |
| 9,471,838 | B2 * | 10/2016 | Miller ................... G06F 16/583 |

\* cited by examiner

*Primary Examiner* — Adolf Dsouza

(57) ABSTRACT

A method and apparatus for providing a warning about a suspect vehicle is provided. During operation automatic-license-plate-reading (ALPR) circuitry will scan a license plate and determine a current location of an owner of a vehicle. If the current location of the owner of the vehicle, and a current location of the vehicle differ, a warning is provided to the user of the ALPR circuitry. In an alternate embodiment, if the current location of all individuals who reside with the owner of the vehicle, and a current location of the vehicle differ, a warning is provided to the user of the ALPR circuitry.

10 Claims, 3 Drawing Sheets

METHOD AND APPARATUS FOR WARNING A USER ABOUT A SUSPICIOUS VEHICLE

BACKGROUND OF THE INVENTION

Automatic License Plate Readers (ALPRs) are commonly used by public-safety officers to identify vehicles. When using an ALPR, a public-safety officer will utilize equipment that is configured to automatically detect license plates on vehicles and provide officers information on owners and their vehicles. For example, an ALPR may provide warnings of wanted individuals, stolen vehicles, vehicles that are not in compliance with the law, . . . , etc. ALPR functionality allows an officer to drive around and automatically be made aware of the status of vehicles they encounter as well as statuses of their owners. An ALPR typically runs a license-plate check on each vehicle an officer encounters while driving. Because of this, hundreds of vehicles may be checked per hour while the officer simply drives. While an ALPR is a powerful tool, it would be beneficial if the ALPR could also help identify potential vehicles used in a crime after a crime has been committed.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to help identify vehicles used in a crime, a method and apparatus for providing a warning about a suspect vehicle is provided herein. During operation ALPR circuitry will scan a license plate and determine a location of an owner of a vehicle. If the location of the owner of the vehicle, and a location of the vehicle differ, a warning is provided to the user of the ALPR circuitry. In an alternate embodiment, if the location of the owner and the location of all individuals who reside with the owner of the vehicle, differ from the location of the vehicle, a warning is provided to the user of the ALPR circuitry.

Expanding on the above, it is commonly known that when a person wishes to commit a major crime, they typically will not use their own personal vehicle to commit the crime, since doing so will aide in identifying them as suspects to the crime. It is very common for a criminal to steal a vehicle shortly before commission of a crime, and then use that vehicle in committing a crime. Oftentimes the crime is committed prior to the vehicle being reported as stolen. Thus, even if license-plate recognition is performed on the vehicle used in committing the crime, it may not return a warning if the vehicle has not been reported as stolen. However, if it is known that the vehicle's owner (or those who live with the owner) is nowhere near the vehicle at the time license-plate recognition was performed, a warning can be given to the officer. The officer can then choose to investigate further.

Figure 1:
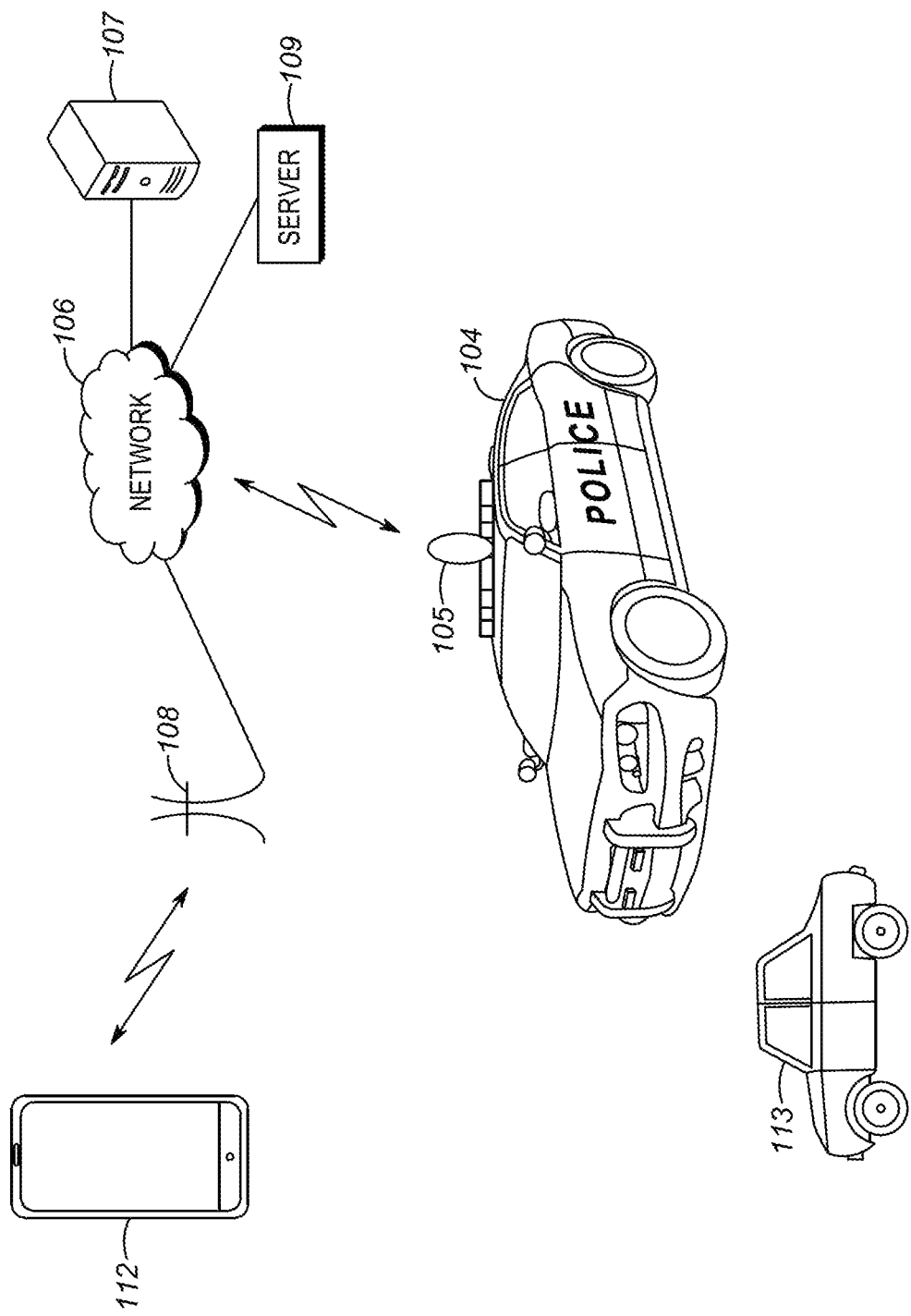
FIG. 1 is a general operating environment of the present invention.

FIG. 1 illustrates a general operational environment. As shown, the operating environment includes ALPR circuitry 105 which comprises at least one camera mounted on police car 104. The operational environment additionally comprises server 109, database 107, network 106, cellular service provider equipment 108, vehicle 113, and smart device 112.

ALPR circuitry 105 is configured to detect license plates and provide a license plate number (or an image of the license plate) to server 109 via network 106. Network 106 preferably comprises a next-generation LTE and/or trunked radio network. Server 109 receives license-plate numbers and accesses an internal or external database 107 in order to determine information regarding the license plate. This information is then transmitted back to ALPR circuitry 105. Finally, smart device 112 comprises a device such as, but not limited to a smartphone, a tablets, a smart watch, . . . , etc.

During operation, ALPR circuitry 105 will identify license plates and send license-plate information over network 106 to server 109. Server 109 will access various databases 107 to determine relevant information associated with the license-plate number. The relevant information comprises information such as a make and model of the automobile, whether or not the automobile is wanted, any violations of ordinances/laws for the owner or the vehicle, . . . , etc. This information is then passed to ALPR circuitry 105 and provided to the officer via a user interface.

As discussed, while ALPR circuitry 105 is a powerful tool, it would be beneficial if the circuitry could also help identify potential vehicles used in a crime after a crime has been committed. In order to help identify vehicles used in a crime, ALPR circuitry 105 will determine (or be provided with), a potential location of an owner of the vehicle. If the location of the owner of a particular vehicle, and a location of the particular vehicle differ, a warning is provided to the officer. In an alternate embodiment, if the location of the owner and all individuals who reside with the owner of the particular vehicle, differ from the location of the particular vehicle, a warning is provided to the officer.

A current location of the ALPR circuitry 105 is used as a proxy for the location of both vehicles 104 and 113. More particularly, a location of ALPR circuitry mounted on a first vehicle 104 is used as a proxy for a location of a first vehicle 104 and second vehicle 113. Additionally, a current location of a smart device 112 associated with the owner of vehicle 113 is used as a proxy for a location of the owner of vehicle 113. Therefore, in order to determine a location of the owner, the owner's smart device is used as a proxy for the location of the owner.

In order to determine a location of a smart device, server 109 accesses database 107 to determine a smart device number or MAC address of the smart device for the owner of the vehicle. Server 109 then contacts an associated cellular service provider in order to determine a location of the smart device. The location of the smart device is then provided to ALPR circuitry 105 by server 109. If the location of the smart device is near the current location of ALPR circuitry 105, then the owner of the particular vehicle is presumed to be driving the particular vehicle, otherwise, the owner of the particular vehicle is presumed to be not driving the particular vehicle, and the ALPR circuitry will send a warning to the officer.

It should be noted that most smart devices comprise location circuitry that is able to locate the device. Enhanced 911 (E911) services require that a public-safety entity (e.g., a dispatch operator, or server 109) be able to determine a geographic location of the smart device in real time. Enhanced 911, E-911 or E911 is a system used in North America to automatically provide the caller's location to 911 dispatchers. 911 is the universal emergency telephone number in the region. In the European Union, a similar system exists known as E112 and known as eCall. Thus, using E911 services, server 109 can contact cellular provider 108 in order to determine a location of device 112.

With the location of device 112 serving as a proxy for a location of an owner of vehicle 113, and the location of ALPR circuitry 105 serving as a proxy for the location of vehicle 113, ALPR circuitry 105 will determine if the owner and the vehicle are within a predetermined distance of each other (e.g., 1000 feet). If they are within a predetermined distance from each other, the owner will be determined to be driving the vehicle.

It should be noted that it may take several seconds to receive a location of the owner of device 113 after querying server 109. Both vehicles may have moved quite a distance in this time period. Because of this, the location of vehicle 113 provided by server 109 may comprise the location of the vehicle when server 109 was queried. Therefore, when comparing the location of vehicle 113 to the location of the owner, the location of ALPR circuitry 105 at the time the query to server 109 is made may serve as a proxy for the location of vehicle 113.

Figure 2:
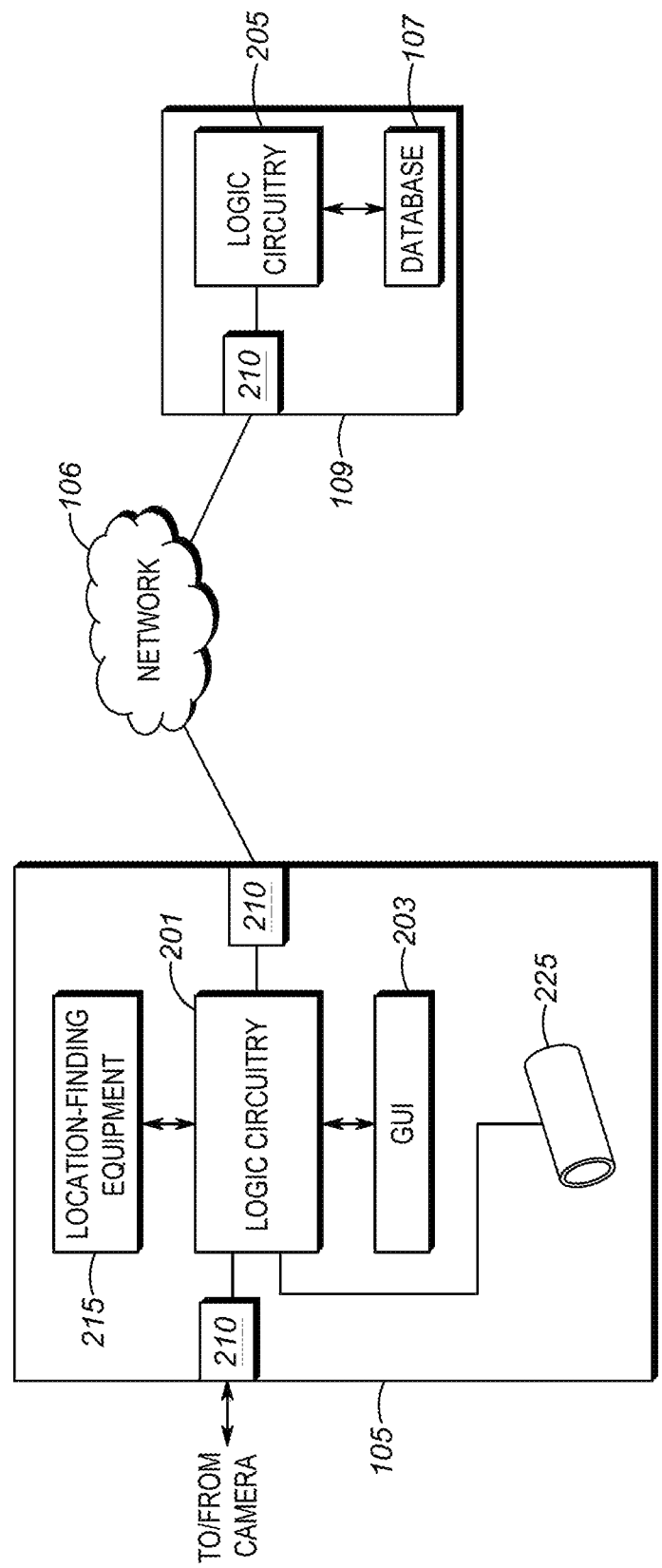
FIG. 2 is a block diagram of an ALPR circuitry and a server.

FIG. 2 is a block diagram of ALPR circuitry 105 and server 109 of FIG. 1. It should be noted that while the functionality of circuitry 105 and server 109 are shown taking place in separate entities separated by network 106, one of ordinary skill in the art will recognize that the functionality may be combined into a single device, or distributed among multiple other devices.

As shown, circuitry 105 comprises logic circuitry 201, location-finding equipment 215, network interfaces 210, graphical-user interface (GUI) 203, and camera 225. Logic circuitry 201 comprises a digital signal processor (DSP), general purpose microprocessor, a programmable logic device, or application specific integrated circuit (ASIC) and is utilized to determine when to warn a user about a vehicle's owner not being in possession of the vehicle.

GUI 203 provides a man/machine interface for receiving an input from a user and displaying information. For example, GUI 203 may provide a way of conveying (e.g., displaying) information received from processor 201. Part of this information may comprise a warning on a vehicle and vehicle information received from server 109. In order to provide the above features (and additional features), GUI 203 may comprise any combination of a touch screen, a computer screen, a keyboard, or any other interface needed to receive a user input and provide information to the user.

Location-finding equipment 215 comprises standard equipment/circuitry used to locate ALPR circuitry 105. Such equipment typically comprises a GPS receiver, however, other equipment may be utilized as well. As discussed above, the location of GPS receiver 215 will serve as a proxy for a location of an automobile where license-plate recognition is taking place.

Camera 225 comprises a sensor that electronically captures a sequence of video frames (i.e., a sequence of one or more still images), with optional accompanying audio, in a digital format. Although not shown, the images or video captured by camera 225 may be stored in a storage component within ALPR 105, or in any storage component accessible via network interface 210.

Server 109 comprises logic circuitry 305. Again, logic circuitry 305 comprises a digital signal processor (DSP), general purpose microprocessor, a programmable logic device, or application specific integrated circuit (ASIC) and is configured to receive a license plate number, access database 107 to determine vehicle information, owner information, and a smart device identity (e.g., a telephone number) for an owner of the vehicle. Logic circuitry 205 is also configured to determine a location of the smart device from a cellular provider. Finally, logic circuitry 205 is configured to provide the vehicle information, owner information, and a location of the smart device to ALPR circuitry 105.

It should be noted that the term "vehicle information" encompasses relevant information about a vehicle (e.g., make, model, violations, color, . . . , etc.) while the term "owner information" encompasses relevant information about an owner of a vehicle (e.g., name, address, height, hair color, wanted information, picture, . . . , etc.).

Database 107 (this time shown as a part of server 109) comprises standard random access memory and/or non-volatile storage medias like SSD or HDD and is used to store massive amounts of information on automobiles, individuals and their associated owners. Database 107 comprises information such as a license-plate number, an individual(s) name associated with the license-plate number, automobile information associated with the license-plate number, a mobile phone number (or media access control (MAC) address) associated with the individual, owner information associated with the license-plate number . . . , etc.

Both ALPR circuitry 105 and server 109 comprise network interfaces 210. Network interfaces 210 comprises elements including processing, modulating, and transceiver elements that are operable in accordance with any one or more standard or proprietary wired and/or wireless interfaces, wherein some of the functionality of the processing, modulating, and transceiver elements may be performed by means of associated logic circuitry through programmed logic such as software applications or firmware. Examples of network interfaces (wired or wireless) include Ethernet, T1, USB interfaces, IEEE 802.11b, IEEE 802.11g, etc.

It should be noted that the above-described technique can be applied to more than one individual. For example, database 107 may provide locations of several devices associated with the automobile, and a warning may be provided if none of the locations are within a predetermined distance from the ALPR location. So, for example, server 109 may determine all individuals living at the owner's address, or all individuals who are identified as being relatives of the owner of the vehicle. Locations of devices for people living at the address may be provided to ALPR circuitry 105, or locations of devices for relatives of the owner of the vehicle may be provided to ALPR circuitry.

With the above in mind, ALPR circuitry maps a location of at least one smart device and a location of the ALPR circuitry to a warning state (warn or not warn). The mapping process preferably comprises an operation that associates each element of a given set (the domain) with one or more elements of a second set (the range). The locations comprise the domain, while the warning state comprise the range. The mapping may be explicit based on predefined rules (e.g., locations within 1000 feet), or the mapping may be trained via neural network modeling. The mapping produces the warning state. The warning state preferably comprises a decision to warn or not to warn a user.

Thus, logic circuitry 201 will then map the location of the ALPR circuitry and the location of at least one smart device to a warning state. More specifically, if the locations x and y are elements of a group of possible locations X (i.e., x, y∈X), we say that f "takes the value" or "maps to" f(x,y) at x and y. The set X is called the domain of the function f. The set of possible outcomes of f(x,y) is called the range. The mapping process preferably comprises an operation that associates elements of a given set (the domain) with one or more elements of a second set (the range). The locations comprise the domain, while the warning state comprise the range. For example, WARNING STATE=F(x,y), where WARNING STATE is the range and x and y comprise the domain.

As discussed, because the ALPR circuitry and vehicle 113 may be moving, it may be preferable to determine the location of the ALPR circuitry at the time the license plate for vehicle 113 was scanned and/or provided to server 109, since this may be the point in time both vehicles are the closest. When comparing the location of the ALPR circuitry to the location of a smart device, it may be preferable to use the location of the ALPR circuitry at a time when the license plate was scanned.

With the above in mind, FIG. 2 shows an apparatus 105 comprising a GPS receiver 215 configured to determine a location of the apparatus, camera 225 configured to capture an image of a license plate, and logic circuitry 201 configured to receive a location of a smart device for an owner associated with the license plate and provide a warning if the location of the smart device differs from the location of the apparatus by a predetermined amount.

A network interface 210 is provided and configured to provide a license-plate number to a server and receive the location of the smart device from the server.

A graphical-user interface (GUI) 203 is provided coupled to the logic circuitry, the GUI configured to output the warning to the user. The warning may be audible and/or visual.

Figure 3:
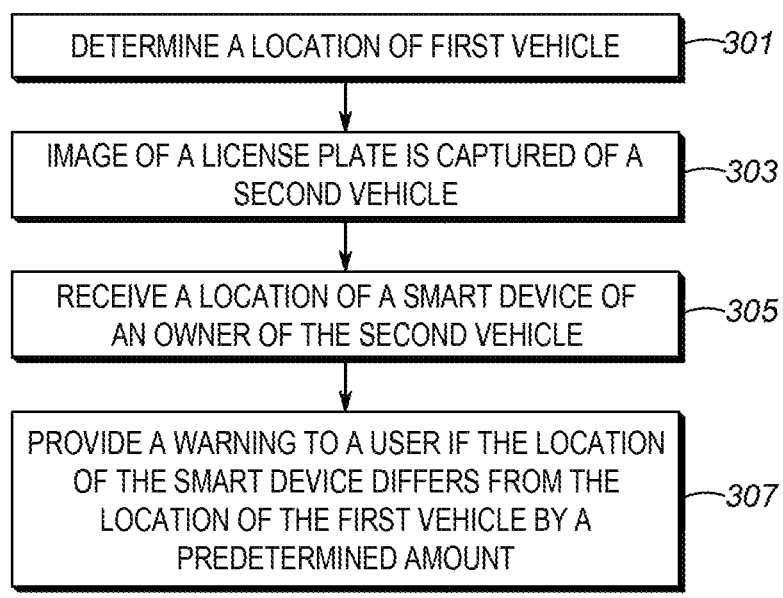
FIG. 3 is a flow chart showing operation of the ALPR circuitry.

FIG. 3 is a flow chart showing operation of ALPR 105 of FIG. 2. The logic flow begins at step 301 where location-finding equipment 215 determines a location of first vehicle 104. As discussed above, since first vehicle 104 comprises ALPR circuitry 105, the location of ALPR circuitry 105 serves as a proxy for the location of vehicle 104. In addition, the location of ALPR circuitry 105 will also serve as a proxy for vehicle 113.

The logic flow continues to step 303 where an image of a license plate is captured with camera 225. The license plate attached to second vehicle 113. The image and/or license plate number (determined by logic circuitry 201) is provided to server 109, and in response network interface 210 receives a location of a smart device of an owner of the second vehicle (step 305). It should be noted that both vehicle information and owner information may also be received at this point. Logic circuitry 201 then determines if the location of the smart device differs from the location of the first vehicle by a predetermined amount, and provides a warning to a user via GUI 203 if the location of the smart device differs from the location of the first vehicle by a predetermined amount (step 307). The warning could be audible (alarm) and/or visible (text), both provided through the GUI.

It should be noted that all "locations" referred to above comprise geographic locations.

In the foregoing specification, specific embodiments have been described. However, one of ordinary skill in the art appreciates that various modifications and changes can be made without departing from the scope of the invention as set forth in the claims below. For example, while the ALPR system was shown attached to a vehicle, one of ordinary skill in the art will recognize that the ALPR system may also be stationary (e.g., attached to a light pole), or attached to any other type of vehicle, for example, a drone. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
a GPS receiver configured to determine a location of the apparatus;
a camera configured to capture an image of a license plate;
logic circuitry configured to receive a location of a smart device for an owner associated with the license plate and provide a warning if the location of the smart device differs from the location of the apparatus by a predetermined amount.

2. The apparatus of claim 1 further comprising a network interface configured to provide a license-plate number to a server and receive the location of the smart device from the server.

3. The apparatus of claim 1 further comprising a graphical-user interface (GUI) coupled to the logic circuitry, the GUI configured to output the warning.

4. The apparatus of claim 1 wherein the warning comprises an audible warning.

5. The apparatus of claim 1 wherein the warning comprises a visible warning.

6. An apparatus comprising:
a GPS receiver configured to determine a location of the apparatus;
a camera configured to capture an image of a license-plate number;
a network interface configured to provide the license-plate number to a server and receive a location of a smart device for an owner associated with the license-plate number;
logic circuitry configured to receive a location of a smart device for an owner associated with the license plate and output a warning if the location of the smart device differs from the location of the apparatus by a predetermined amount;
a graphical-user interface (GUI) coupled to the logic circuitry, the GUI configured to output the warning, wherein the warning comprises an audible and/or a visible warning.

7. A method comprising the steps of:
determining a location of a first vehicle, wherein the first vehicle comprises an automatic-license plate reader (ALPR);
capturing an image of a license plate with the ALPR, the license plate attached to a second vehicle;
receiving a location of a smart device of an owner of the second vehicle;
providing a warning to a user if the location of the smart device differs from the location of the first vehicle by a predetermined amount.

8. The method of claim 7 further comprising the step providing a license-plate number to a server and the step of receiving the location of the smart device comprises the step of receiving the location from the server.

9. The method of claim 7 wherein the step of providing the warning comprises the step of providing an audible and/or a visible warning.

10. The method of claim 7 wherein the location of the ALPR serves as a proxy for the location of the first vehicle.

* * * * *